(12) United States Patent
Zhang et al.

(10) Patent No.: US 8,923,556 B2
(45) Date of Patent: Dec. 30, 2014

(54) METHOD AND APPARATUS FOR DETECTING PEOPLE WITHIN VIDEO FRAMES BASED UPON MULTIPLE COLORS WITHIN THEIR CLOTHING

(75) Inventors: Yan Zhang, Buffalo Grove, IL (US); Boaz J. Super, Westchester, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 596 days.

(21) Appl. No.: 13/329,250

(22) Filed: Dec. 17, 2011

(65) Prior Publication Data

US 2013/0156299 A1    Jun. 20, 2013

(51) Int. Cl.
*G06K 9/00* (2006.01)
*G06K 9/46* (2006.01)
*G06T 7/40* (2006.01)

(52) U.S. Cl.
CPC .......... *G06K 9/00771* (2013.01); *G06K 9/4652* (2013.01); *G06T 7/408* (2013.01); *G06K 9/00362* (2013.01)
USPC .......................................... 382/103; 382/165

(58) Field of Classification Search
None
See application file for complete search history.

(56) References Cited

U.S. PATENT DOCUMENTS

| | | | |
|---|---|---|---|
| 5,923,365 A * | 7/1999 | Tamir et al. | 348/169 |
| 6,810,343 B2 | 10/2004 | McKee | |
| 7,359,529 B2 * | 4/2008 | Lee | 382/103 |
| 7,853,072 B2 | 12/2010 | Han et al. | |
| 7,957,565 B1 | 6/2011 | Sharma et al. | |
| 7,986,828 B2 | 7/2011 | Rao et al. | |
| 8,279,286 B2 * | 10/2012 | Wagg et al. | 348/169 |
| 2010/0183225 A1 * | 7/2010 | Vantaram et al. | 382/173 |
| 2011/0169917 A1 | 7/2011 | Stephen et al. | |
| 2012/0159290 A1 * | 6/2012 | Pulsipher et al. | 714/819 |

FOREIGN PATENT DOCUMENTS

GB    2467643 A    8/2010

OTHER PUBLICATIONS

Beetz et al. (2007) "Visually tracking football games based on TV broadcasts." Proc. 20$^{th}$ Int'l Joint Conf. on Artificial Intelligence, pp. 2066-2071.*
Iwase et al. (Aug. 2004) "Parallel tracking of all soccer players by integrating detected positions in multiple view images." Proc. 17$^{th}$ Int'l Conf. on Pattern Recognition, vol. 4 pp. 751-754.*
Khatoonabadi et al. (2009) "Automatic soccer players tracking in goal scenes by camera motion estimation." J. Image and Vision Computing, vol. 27 pp. 469-479.*
Ohno et al. (Sep. 2000) "Tracking players and estimation of the 3d position of a ball in soccer games." Proc. 15$^{th}$ Int'l Conf. on Pattern Recognition, vol. 1 pp. 145-148.*

(Continued)

*Primary Examiner* — Barry Drennan

(57) ABSTRACT

A video analytic device performs a method for detecting people within frames of video based upon multiple colors within their clothing. The method includes: receiving a frame of video; and determining that a first color region within the frame matches a first color of interest for a clothing uniform, wherein the determining is based on a first set of color representation constraints. The method further includes determining that a second color region within the frame matches a second color of interest for the clothing uniform, wherein the determining is based on a second set of color representation constraints and the first and second colors of interest are different. In addition, the method includes applying a set of geometric constraints to the first and second color regions to determine a count of people within the frame wearing the clothing uniform.

19 Claims, 11 Drawing Sheets

(56) References Cited

OTHER PUBLICATIONS

Vos, R. (2010) "3d position estimation of sports players through multi-view tracking." MS Thesis, Stellenbosch University.*

Yamada et al. (2002) "Tracking players and a ball in video image sequence and estimating camera parameters for 3d interpretation of soccer games." Proc. 16$^{th}$ Int'l Conf. on Pattern Recognition, vol. 1 pp. 303-306.*

D. M. Gavrila and S. Munder, "Multi-cue pedestrian detection and tracking from a moving vehicle", Int'l Journal of Computer Vision, vol. 73, pp. 41-59, 2007.

T. Zhao and R. Nevatia, "Tracking multiple humans in complex situations", IEEE Transactions on Pattern Analysis and Machine Intelligence, vol. 26, pp. 1208-1221, Sep. 2004.

M. Enzweiler and D. M. Gavrila, "Monocular pedestrian detection: survey and experiments", IEEE Transactions on Pattern Analysis and Machine Intelligence, vol. 31, pp. 2179-2195, Dec. 2009.

P. Viola, M. Jones, and D. Snow, "Detecting pedestrians using patterns of motion and appearance", Int'l J. computer Vision, vol. 63, pp. 153-161, Aug. 2003.

N. Dalai and B. Triggs, "Histogram of oriented gradients for human detection", Proceedings of the IEEE Conference on Computer Vision and Pattern Recognition, pp. 886-893, 2005.

P. Felzenszwalb, R. Girshick, D. McAllester, and D. Rananan, "Object detection with discriminatively trained part-based models", IEEE Transactions on Pattern Analysis and Machine Intelligence, vol. 32, pp. 1627-1645, Sep. 2010.

K. Sande, T. Gevers, and C. Snoek, "Evaluating color descriptors for object and scene recognition", IEEE Transactions on Pattern analysis and Machine Intelligence, vol. 32, pp. 1582-1596, 2010.

T. Gevers and A. Smeulders, "Color based object recognition", Pattern Recognition, vol. 32, pp. 453-464, 1999.

G. Wu, A. Rahimi et al., "Identifying color in motion in video sensors", Proceedings of the IEEE Conference on Computer Vision and Pattern Recognition, pp. 561-569, 2006.

T. Zhao, R. Nevatia, and B. Wu, "Segmentation and tracking of multiple humans under crowded environment", IEEE Transactions on Pattern analysis and Machine Intelligence, vol. 30, pp. 1198-1211, Jul. 2008.

V. Raband and S. Belongie, "Counting crowded moving objects", Proceedings of the IEEE Conference on Computer Vision and Pattern Recognition, pp. 705-711, 2006.

O. Sidla, Y. Lypetskyy, N. Brandle, and S. Seer, "Pedestrian detection and tracking for counting applications in crowded situations", Proceedings of the IEEE Conference on Video and Signal based Surveillance, 2006.

V. Kettnaker, R. Zabih, "Counting people from multiple cameras", Proceedings of the IEEE Conference on Multimedia Computing and Systems, pp. 267-271, 1999.

A. Chan, Z. Liang, and N. Vasconcelos, "Privacy preserving crowd monitoring: counting people without people models or tracking", Proceedings of the IEEE Conference on Computer Vision and Pattern Recognition, pp. 1-7, 2008.

* cited by examiner

METHOD AND APPARATUS FOR DETECTING PEOPLE WITHIN VIDEO FRAMES BASED UPON MULTIPLE COLORS WITHIN THEIR CLOTHING

FIELD OF THE DISCLOSURE

The present disclosure relates generally to people detection within video frames and, in particular, to a method and apparatus for detecting people within video frames based upon multiple colors within their clothing.

BACKGROUND

Video cameras are widely used for surveillance. For example, commercial Closed-Circuit Television (CCTV) systems use video cameras to enable monitoring in areas such as banks, airports, retail stores, and traffic intersections, to name a few. Present video cameras are mostly digital cameras that generate digital output (i.e., digital images). For example, an Internet Protocol (IP) video camera connects to a network (either wired or wireless) and transmits captured digital images over the network to different devices for storage, display, or analysis. Digital technologies used by video cameras enable automatic analysis of video content. For example, video cameras are used to count people going in and coming out a building. In such a case, the video cameras are often mounted overhead at the building entrance, where the video cameras have little view occlusion and people counting, thereby, is simplified. However, such people counting systems can only detect and count the number of people going in and coming out the facility, and cannot detect people while they are inside the facility. Furthermore, these people detection systems cannot distinguish one type of people (e.g., sales clerks) from other types of people (e.g., customers) due to limited information captured by the video cameras.

Detecting and classifying people using video cameras are often indispensable in many applications such as security surveillance. Employee detection using video cameras is especially useful for workforce management and operation efficiency at many workplaces. People detection systems using video cameras generally vary in their sensing and processing techniques depending on the characteristics and constraints of the specific applications of the video cameras. Despite the abundant research and exploration by both academia and commercial industry, quick and accurate people detection in real-time using video cameras remains challenging due to, for example, the wide variety of human activities and movements, cluttered backgrounds, video camera characteristics (e.g., resolution and frame rate), and large illumination changes.

Accordingly, there is a need for a method and apparatus for accurately detecting people using video cameras deployed inside and outside facilities. In particular, there is a need for a method and apparatus for detecting people within video frames based upon multiple colors within their clothing.

BRIEF DESCRIPTION OF THE DRAWINGS

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
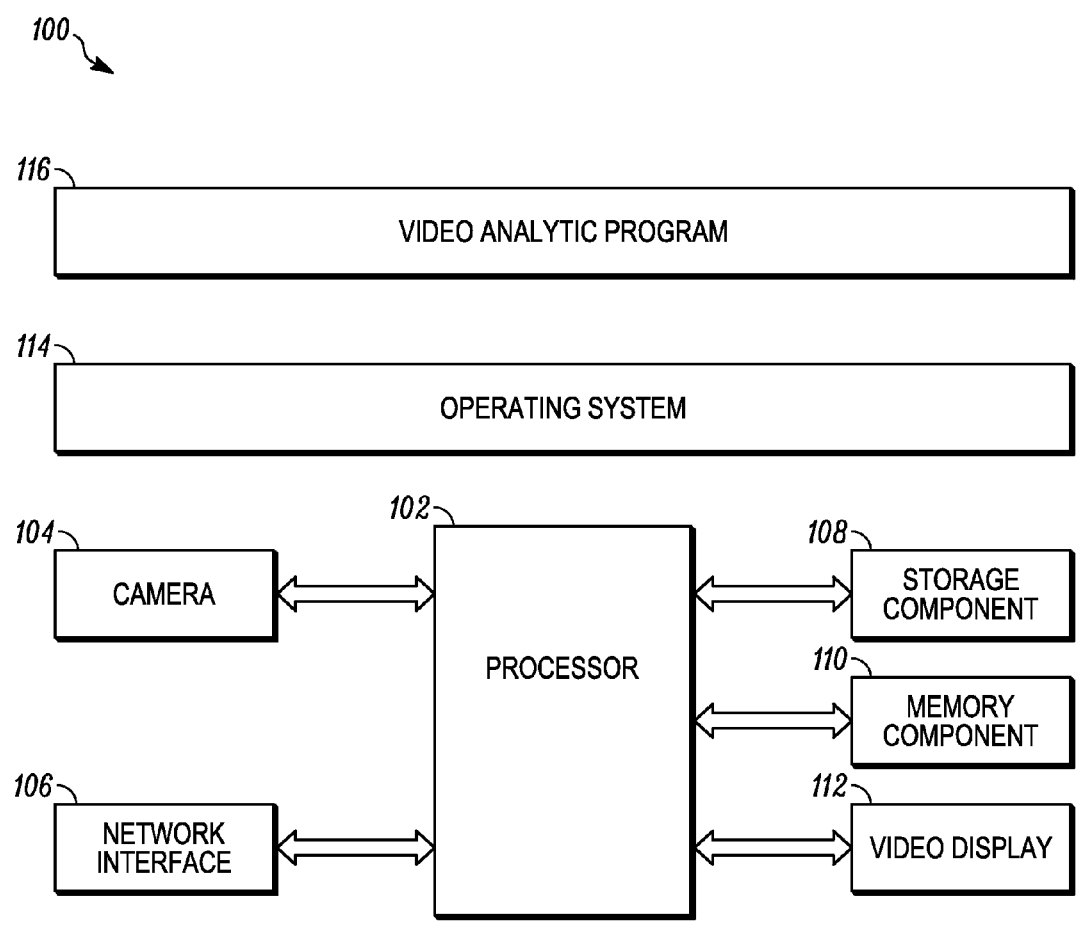
FIG. 1 illustrates a block diagram of a video analytic device implementing some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for detecting people within frames of video based upon multiple (meaning more than one) colors within their clothing. In accordance with the present teachings, a method performed by a video analytic device includes receiving a current frame of video, and determining that a first color region within the current frame matches a first color of interest for a clothing uniform, wherein the determining is based on a first set (meaning one or more) of color representation constraints. The method further includes determining that a second color region within the current frame matches a second color of interest for the clothing uniform, wherein the determining is based on a second set of color representation constraints. The first and second colors of interest are different. Moreover, the method includes applying a set of geometric constraints to the first and second color regions to determine a count of people within the current frame wearing the clothing uniform.

Further in accordance with the present teachings is a non-transient computer readable storage element which stores computer readable code. The stored computer readable code programs a computer to perform a method for detecting people within frames of video based upon multiple colors of their clothing. The method includes receiving a current frame of video, and detecting, within a first resolution image of the current frame, multiple colors of interest to identify a first set of pixels of interest. Moreover, the method includes classifying, within a second and higher resolution image of the current frame, colors of a second set of pixels of interest to identify pixels of the multiple colors of interest, wherein the second set of pixels of interest correspond to the first set of pixels of interest. The method further includes determining a set of color regions within the second and higher resolution image, wherein each of the color regions within the set contains at least one of the pixels of the multiple colors of interest. In addition, the method includes verifying that the set of color regions conform to a set of geometric constraints to determine a count of people, within the current frame, wearing a same type of clothing having the multiple colors of interest.

Referring now to the drawings, and in particular FIG. 1, illustrated is a block diagram of a video analytic device 100 that is adapted (i.e., configured) to perform the methods illustrated by reference to FIGS. 2-11, and implement the embodiments illustrated by reference to FIGS. 2-11. In general, as used herein, the video analytic device 100 being "configured" or "adapted" means that the device 100 is implemented using one or more components (such as memory components, network interfaces, and central processing units) that are operatively coupled, and which, when programmed, form the means for these system elements to implement their desired functionality, for example, as illustrated by reference to the methods shown in FIGS. 2-11. The video analytic device 100 comprises a processor 102 that is communicatively coupled with various system components, including a camera 104, a network interface 106, a storage component 108, a memory component 110, and a video display 112, among others (not shown). The video analytic device 100 further comprises an operating system 114 and a video analytic program 116. Only a limited number of system elements 102-116 are shown for ease of illustration; but additional such elements may be included in the video analytic device 100.

The processing device 102 may be partially implemented in hardware and, thereby, programmed with software or firmware logic or code (e.g., the video analytic program 116) for performing functionality described by reference to FIGS. 2-11; and/or the processing device 102 may be completely implemented in hardware, for example, as a state machine or ASIC (application specific integrated circuit). The storage 108 and memory 110 components can include short-term and/or long-term storage of various information needed for the functioning of the respective elements. The memory may further store software or firmware (e.g., the video analytic program 116) for programming the processing device 102 with the logic or code needed to perform its functionality.

In the illustrative embodiment, the camera 104 is attached (i.e., connected) to the video analytic device 100 and communicates with the processor 102. For example, the camera 104 attaches to the video analytic device 100 using a Universal Serial Bus (USB) connection interface; or the camera is integral to and shares the same physical platform with the video analytic device 100. Alternatively, one or more cameras (not shown) are attached to a communication network (not shown), and communicate (either wired or wirelessly) with the video analytic device 100 using the network interface 106. For example, ten cameras are deployed at various locations at a workplace, and all ten cameras are attached to the same network as the video analytic device 100. In such a case, the video analytic device 100 receives, for processing, frames of video from each of the ten cameras using the network interface 106. Where cameras are connected wirelessly to the network interface 106, it includes elements including processing, modulating, and transceiver elements that are operable in accordance with any one or more standard or proprietary wireless interfaces, wherein some of the functionality of the processing, modulating, and transceiver elements may be performed by means of the processing device 102 through programmed logic such as software applications or firmware stored on the storage component 108 or through hardware. Examples of network interfaces (wired or wireless) include Ethernet, T1, USB interfaces, IEEE 802.11b, IEEE 802.11g, etc.

A camera (also interchangeably referred to herein as video camera or digital video camera) electronically captures a sequence of frames (i.e., still images) with colors in digital format. The frames or still images are also commonly known as frames of video or video frames. A frame is a rectangular or square grid of pixels. Each pixel represents a single point in the frame. Accordingly, a frame includes multiple rows of pixels. The number of rows of pixels and the number of pixels in each row in the frame define a resolution of the frame. Moreover, the resolution of the frame defines a resolution of the camera. The color of each pixel is represented by a number of bits. For example, the color of each pixel is represented by twenty four bits. The number of bits representing the color of a pixel is also referred to herein as color depth. In addition to resolution and color depth, a video camera has other technical attributes or characteristics, such as frame rate (meaning the number of frames the camera captures per second). Each frame has an associated resolution, color depth, and color space information. The color space information in a frame indicates how the color of each pixel is represented in the frame.

Color space is an abstract mathematical model describing the way colors can be represented as tuples (also interchangeably referred to herein as color values) of numbers. Typically, the tuples have three or four values. A commonly known color space is Red, Green, and Blue (RGB) color space. In the RGB color space, each color is represented as a tuple with three values, such as (255, 0, 80). The three values of a RGB tuple (i.e., a RGB color value) expresses red, green, and blue lights that are added together to produce the color represented by the RGB tuple. A RGB tuple is therefore denoted as (R, G, B). For example, each value in a RGB tuple is not less than 0 and not greater than 255. Normalized RGB (also known as nRGB and chromaticity) color space is another well known color space. Each nRGB color value, (r, g, b), in the nRGB color space is transformed or derived from a corresponding RGB color value, (R, G, B), using the formula:

$r=R/(R+G+B)$;

$g=G/(R+G+B)$;

$b=B/(R+G+B)$.

The transformation from RGB color values to nRGB color values normalizes the RGB color values. Normalization of the RGB color values means that the r, g, and b values in the nRGB color spaces are scale-invariant, and therefore invariant to light intensity changes, shadows, and shading. Hue, Saturation, and Intensity (HSI) color space is another commonly used color space which separates intensity from chromaticity. A HSI color value is often denoted as (H, S, I). Generally, a color value in one color space can be transformed into and expressed in another color space. For example, RGB color values can be transformed into HSI color values. In addition to the RGB, nRGB, and HSI color spaces, there are numerous other well known color spaces, such as CYMK (Cyan, Magenta, Yellow, and Black), HSV (Hue, Saturation, and Value), and HSL (Hue, Saturation, and Lightness/Luminance) color spaces.

Turning back to the description of the components of FIG. 1, the video analytic program 116 runs on top of the operating system 114 (e.g., Windows 7 or Linux) and is stored in the storage component 108. When the video analytic program 116 is requested by the operating system 114 to be launched, it is loaded into the memory component 110 and executed therein by the processor 102. The processing device 102 uses the video analytic program 116 to analyze frames of video, and detect people within the frames. The video analytic program 116 is illustrated herein as a software application program that physically resides and runs in the single video analytic device 100. Alternatively, the video analytic program 116 runs over more than one video analytic device in a manner of distributed computing. One or more layers of software programs may exist between the video analytic program 116 and the operating system 114. For example, the video analytic program 116 may be implemented in C# computer language and runs in a .NET Framework environment (not shown), and the .NET Framework environment exists as a layer between the video analytic program 116 and the operating system 114. In another illustrative embodiment, the video analytic program 116 is implemented in firmware or hardware.

Figure 2:
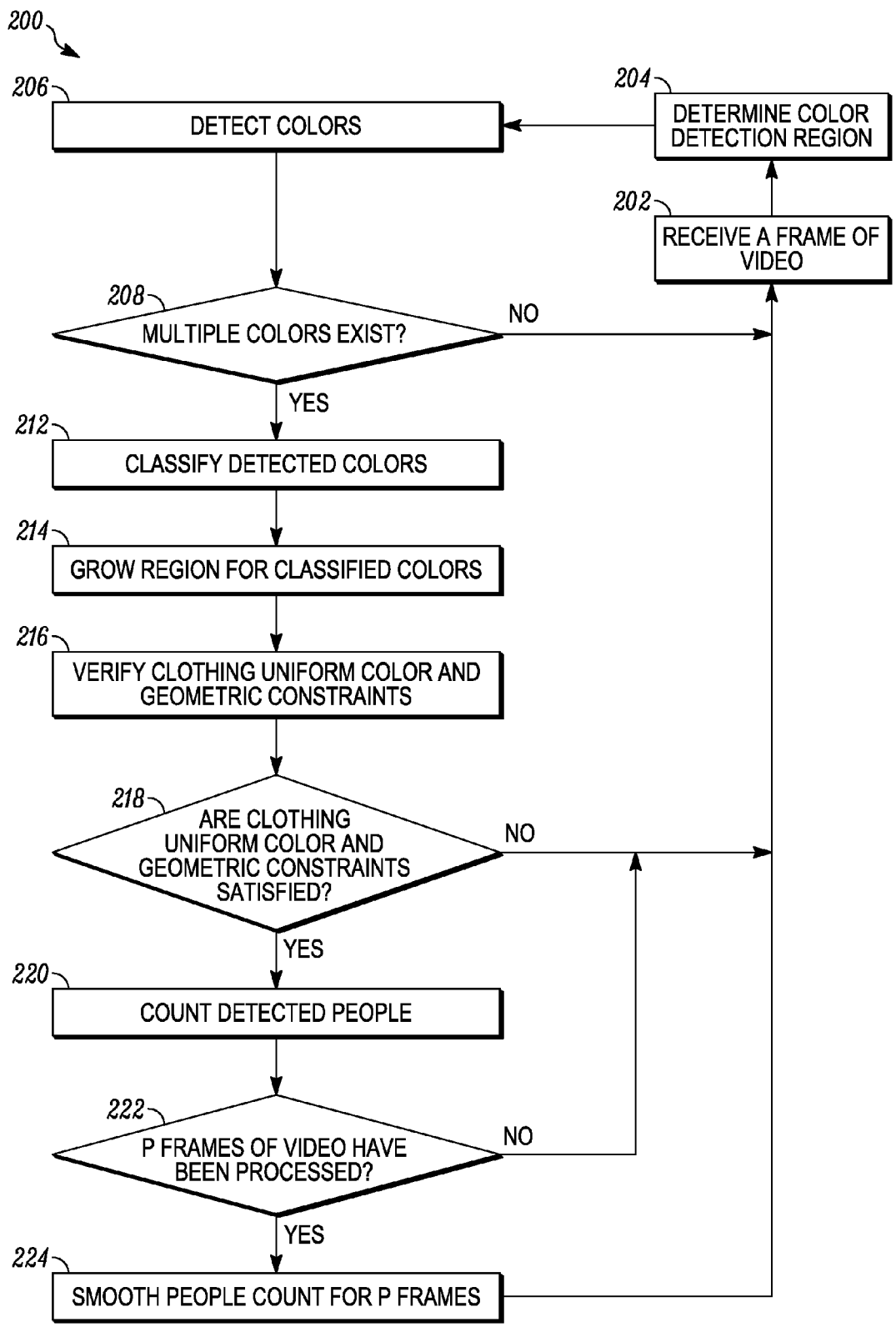
FIG. 2 is a logical flowchart illustrating a method for detecting people within frames of video based upon multiple colors within their clothing in accordance with some embodiments.
Figure 3:
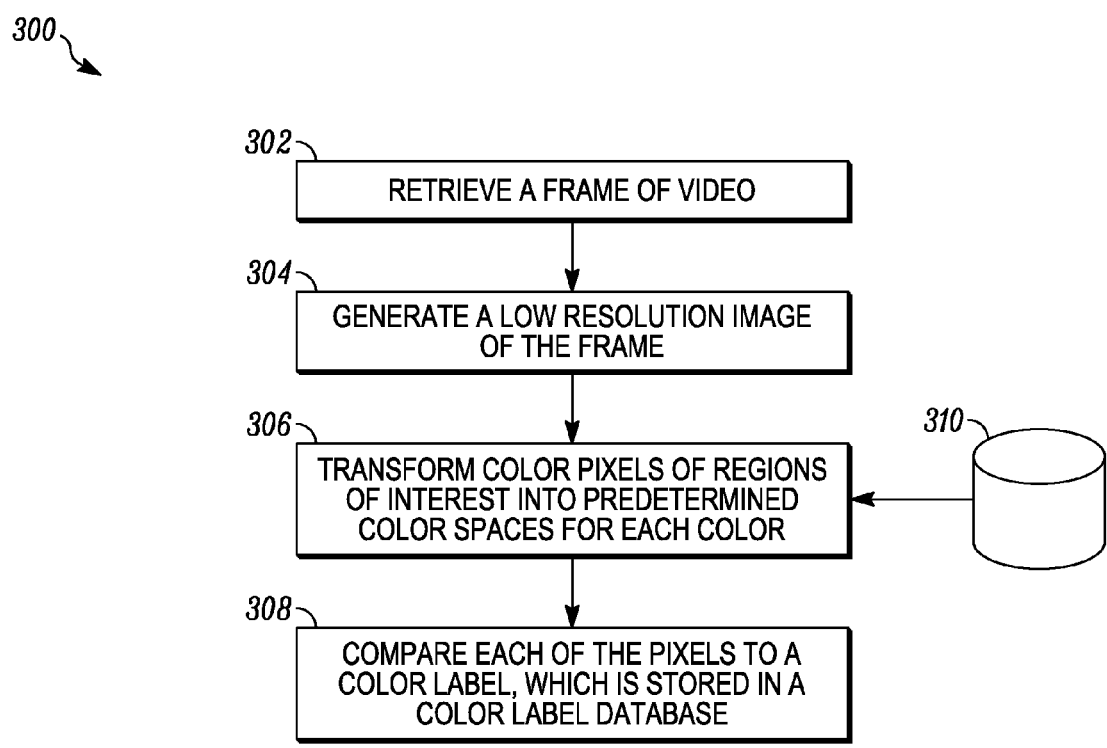
FIG. 3 is a logical flowchart illustrating a method for color detection to facilitate detecting people within frames of video based upon multiple colors within their clothing in accordance with some embodiments.
Figure 4:
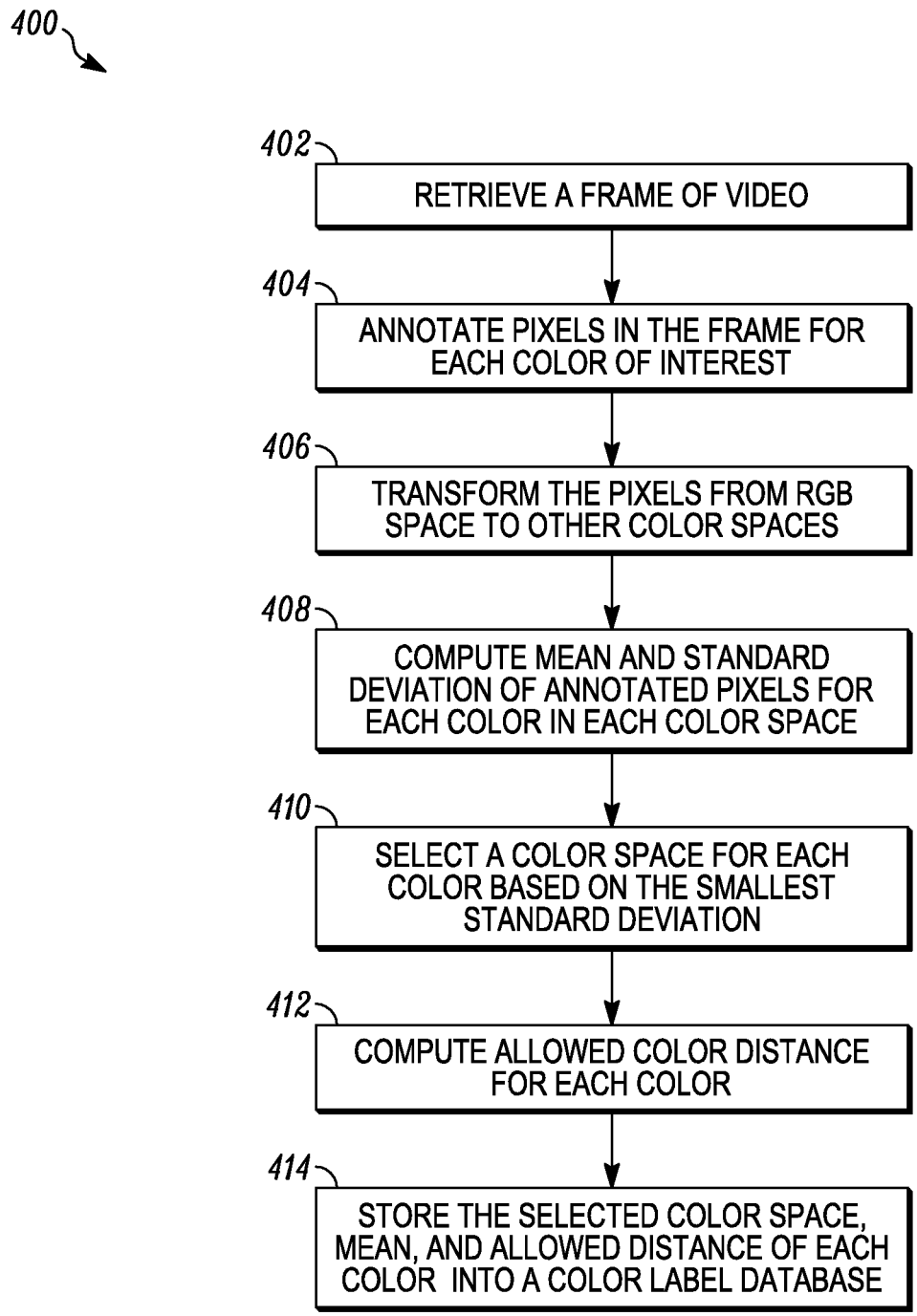
FIG. 4 is a logical flowchart illustrating a method for training color detectors to facilitate the detecting of people within frames of video based upon multiple colors within their clothing in accordance with some embodiments.
Figure 5:
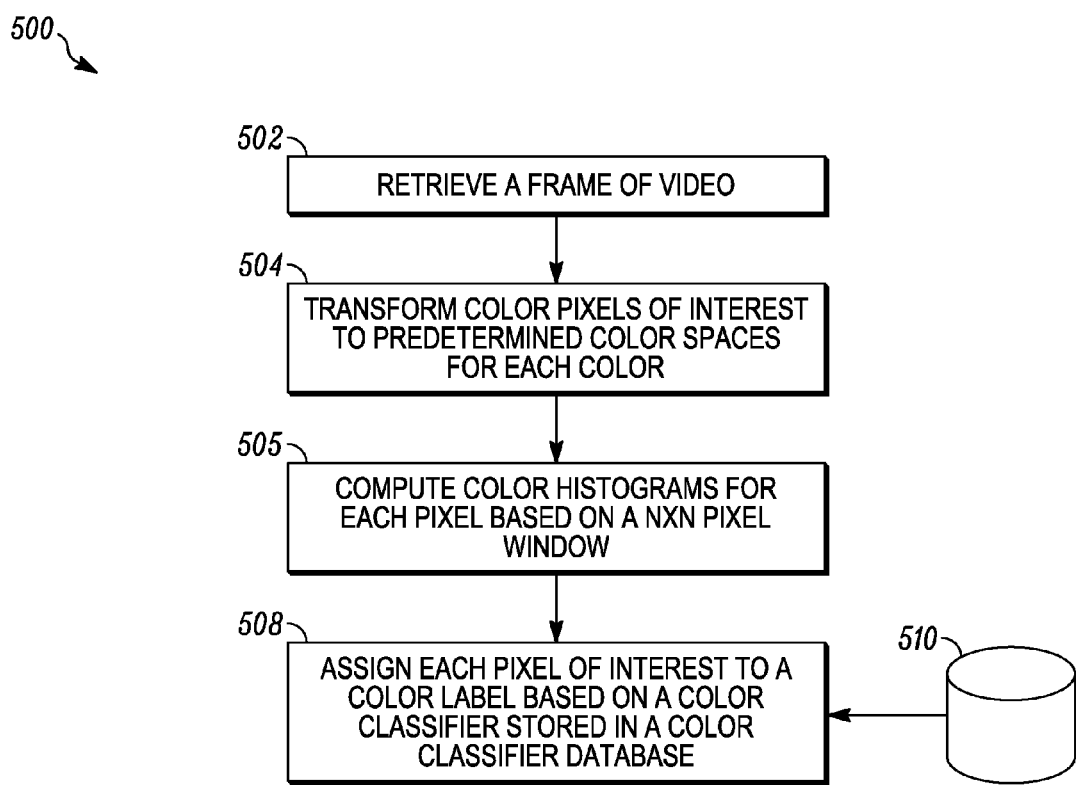
FIG. 5 is a logical flowchart illustrating a method for color feature computation and classification to facilitate detecting people within frames of video based upon multiple colors within their clothing in accordance with some embodiments.
Figure 6:
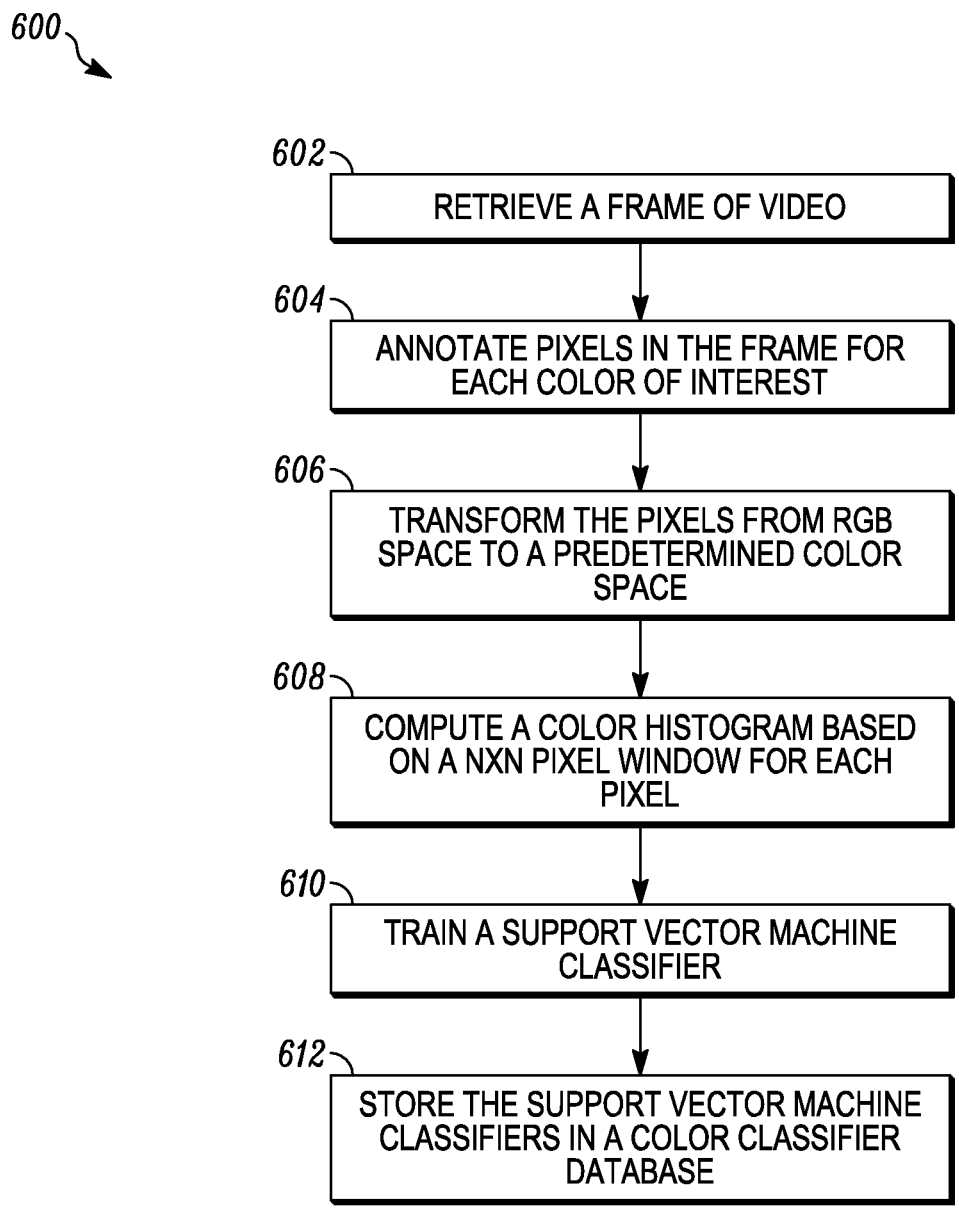
FIG. 6 is a logical flowchart illustrating a method for training color classifiers to enable the detecting of people within frames of video based upon multiple colors within their clothing in accordance with some embodiments.
Figure 7:
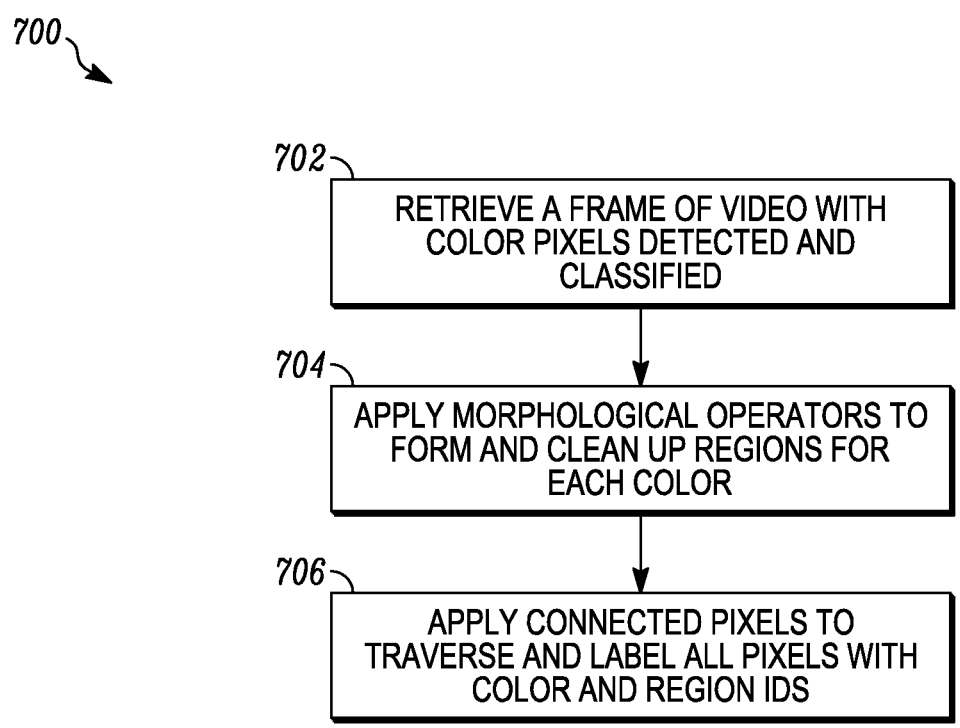
FIG. 7 is a logical flowchart illustrating a method for growing color regions to enable the detecting of people within frames of video based upon multiple colors within their clothing in accordance with some embodiments.
Figure 8:
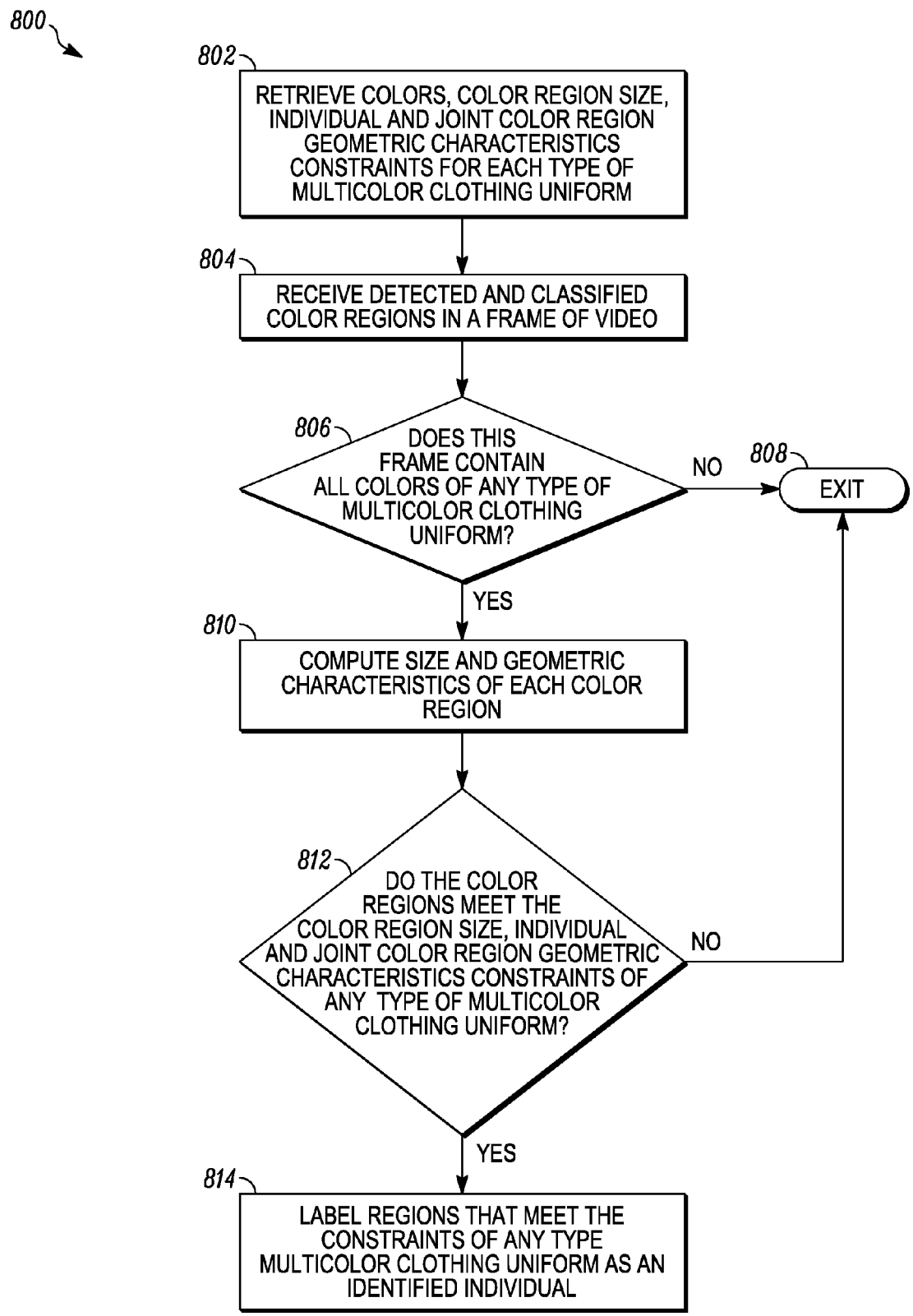
FIG. 8 is a logical flowchart illustrating a method for applying color and geometric constraints to color regions to enable the detecting of people within frames of video based upon multiple colors within their clothing in accordance with some embodiments.

We now turn to a detailed description of the methods performed by the video analytic device 100 (by being programmed with the video analytic program 116) in accordance with the teachings herein and by reference to the remaining figures. FIG. 2 illustrates a logical flow diagram showing a method 200 for detecting people within frames of video based upon multiple colors within their clothing, such as a uniform (also referred to herein as clothing uniform and multicolor clothing uniform). In one implementation scenario, the uniform is an employee uniform, such as for a Public Safety or a commercial retail employee. As used herein a uniform is defined, in general, as a same type of clothing worn by multiple people, and which satisfy the same color and geometric constraints.

The multiple colors within each type of clothing uniform are also referred to herein as colors of interest in detecting people, within video frames, wearing the type of clothing uniform. Each color of interest generally exists in one or more areas within a multicolor clothing uniform. For example, a multicolor clothing uniform has a blue torso and two green sleeves. In such a case, within a video frame that captures a person wearing this type of multicolor clothing uniform, the torso and sleeves areas are termed herein as color regions. In general, a color region comprises pixels of a same color of interest (meaning the color of the color region). Moreover, the color regions of each multicolor clothing uniform conform to a set of constraints, such as color representation constraints and geometric constraints. Color representation constraints include color labels and color classifiers. A color label and a color classifier collectively represent a color of interest within a clothing uniform.

Turning now to the particulars of method 200, at 202, the video analytic device 100 receives a video frame, which is also interchangeably referred to herein as a "current frame" meaning that it is a frame that the video analytic device 100 is currently processing in accordance with the teachings herein. The current frame can be from a live video stream (e.g., frames of video from the camera 104 in real-time), or a pre-recorded video stream (e.g., frames of video that are pre-recorded and stored in a database (not shown) or a data storage device (not shown)).

The video analytic device 100, at 204, determines a color detection region within the frame for color detection. A color detection region is the part of the current frame that the video analytic device 100 processes to detect people based on multiple colors within their clothing uniform. In some instances, the color detection region is the entire frame, but not always. Accordingly, in other instances, the color detection region is a portion, part or subset of the entire frame (meaning not the entire frame). For example, when two cameras are mounted on opposite sides of an aisle at a workplace, two respective frames captured at the same time by the two cameras may contain overlapping area (e.g., top one hundred rows of pixels in each frame comprise an overlapping area) depending on the positioning of the cameras. In such a case, the color detection region in frames from each camera is determined such that people detection is not performed twice in the overlapping area. For example, the color detection region in frames from one video camera excludes the non-overlapping area, while the color detection region in frames from the other video camera includes the overlapping area.

In another example, method 200 is performed on the entire frame once every N frames, wherein N is an integer (such as 5 or 10) that can be chosen based on the frame rate and dynamics in the field-of-view (FOV) of the underlying camera. In such a case, the video analytic device 100 performs method 200 on the entire frame for one frame, and on a portion of the frame termed herein as an "incremental region" in the other N−1 frames. The incremental region within one such frame includes the region where colors of interest were detected in a previous frame. In other words, the color detection region in one such frame (e.g., a current frame) corresponds to the color detection region in a previous frame. Moreover, to determine the incremental region, the video analytic device 100 can apply a scale factor greater than one (1) to adjust the size of the regions between consecutive frames as a safeguard. The scale factor is applied to the region where colors of interest were detected in the previous frame. For example, when the region in a previous frame where colors of interest were detected has a size of 100 by 110 pixels, the incremental region can be set to a size of 110 by 121 pixels in the current frame. In one embodiment of the present teachings, the previous frame is the immediate preceding frame to the current frame. Alternatively, the previous frame is some multiple (e.g., third) preceding frame to the current frame, in reverse order of time.

People detection based on incremental regions is also referred to herein as a tracking mechanism. The tracking mechanism takes advantage of the fact that two consecutive frames of video are captured within a short amount of time (e.g., two (2) seconds) and, thereby, often differ in a small amount of pixels. By benefiting from the motion continuity of frames of video, the tracking mechanism improves computational efficiency in performing the method 200, while maintaining detection accuracy.

At 206, the video analytic device 100 detects colors of interest in the current frame. Any resolution of the current frame can be used for the color detection process. However, in accordance with the present teachings, color detection is performed in a lower resolution (meaning a resolution that is lower than the resolution of the current frame) image of the frame. The lower resolution (e.g., one fourth of the resolution of the frame) enables a faster color detection process. The video analytic device 100, at 206, detects colors of interest by examining the color of pixels within the frame, and identifying a set of pixels of colors of interest. Detecting colors of interest in the lower resolution image of the frame is further illustrated by reference to a method 300 shown as a flowchart in FIG. 3.

At 302, the frame of video (i.e., the current frame received at 202) is retrieved or received. Depending on the particular implementation scenario, either the entire frame or a portion thereof (e.g., the incremental region) is processed using method 300. If only a portion of the frame is processed, indication of a color detection region, determined at 204, within the frame is retrieved or received at 302. At 304, a low resolution image of the frame is generated. In one embodiment, the low resolution image is generated using downsampling techniques. For example, the current frame or color detection region is downsampled to one fourth of the frame's resolution. In other words, the low resolution image is created by extracting one pixel out of every four pixels from the frame or color detection region. In another example, the low resolution image of the frame is generated by downsampling the frame to one ninth of the frame's resolution. In an alternative embodiment, the pixel values in the frame may be smoothed by convolution with one or more low-pass filters prior to downsampling.

To detect colors of clothing uniforms in the low resolution image of the frame, the video analytic device 100 compares the color of each pixel in the low resolution image against color representation constraints of the multiple colors of the clothing uniforms. When the color of a pixel matches a color representation constraint of a color within one of the clothing uniforms, the clothing uniform color is deemed to be present in the low resolution image of the frame. An example color representation constraint includes a color label that defines a clothing uniform color. Color labels for each clothing uniforms are generated through a color detector training process described in detail below by reference to FIG. 4.

Accordingly, at 306, a color label for each color of interest of the clothing uniform is retrieved from a color label database 310. Moreover, the RGB color value for each pixel in the low resolution image is transformed into each of the predetermined or target color spaces that are specified by the retrieved color labels. At 308, the color of each pixel in the low resolution image is compared to the multiple color labels. During this comparison, the distance between the pixel's color value in a color label's color space and the color label's color mean is first computed. There is a match between the pixel's color and the color label when this computed distance satisfies a decision function within a color detector corresponding to the color label. A color detector comprises a color label and decision function. For example, where a decision function within a color detector is satisfied when an input distance is less than the color distance within the color detector, the computed distance satisfies the decision function if it is less than the color distance of the color detector. In such a case, the pixel is determined to be in or to have the color label's color. In other words, the pixel's color is a clothing uniform color defined by the matched color label. Accordingly, the clothing uniform color is detected and present in the current frame. All such pixels are collectively termed herein as a set of detected color pixels.

As mentioned earlier, FIG. 4 shows a logical flowchart illustrating a method 400 for training color detectors in accordance with the present teachings. Method 400 enables the video analytic device to adaptively select a color space most appropriate to the detection of each specific color of interest within any given clothing uniform. The video analytic device 100 performs method 400 multiple times to generate or train color detectors for different clothing uniforms. Moreover, due to various imaging conditions, such as different environmental settings of different cameras, method 400 is performed to generate multiple color labels, for each color of interest, from video frames reflecting the various imaging conditions.

The video analytic device 100, at 402, receives a frame of video (i.e., a training frame). The training frame contains one or more persons wearing clothing uniforms. In one particular embodiment, each training frame contains one and only one person wearing a particular clothing uniform. Training frames, captured under different illumination conditions, that contain all colors of interest of a clothing uniform are beneficial to train color detectors that are robust or invariant to various scenarios. At 404, the video analytic device 100 enables a user to annotate (or select) pixels within the frame, where the annotated pixels are in colors of clothing uniforms. For example, within a frame having a person wearing a clothing uniform with a blue torso and two green sleeves, the user annotates pixels (e.g., 50,000 pixels of each color) of blue color in the torso area and of green color in the two sleeve areas.

Generally, each pixel's color value within a frame is represented as a RGB tuple. However, the teachings herein are applicable to any color space in which the pixels' color values are represented. At 406, for each clothing uniform color within the training frame, the annotated pixels' color values are transformed from RGB values to color values in other color spaces (also referred to herein as target color spaces). In this illustrative embodiment, the RGB values of the annotated pixels are transformed to color values in the nRGB and HSI color spaces. However, the teachings herein are applicable to any color spaces.

At 408, for each clothing uniform color within the training frame, a statistical mean ($\mu$) and a standard deviation ($\sigma$) are derived (i.e., computed) based on the annotated pixels' color values in target nRGB and HSI color spaces. The statistical mean $\mu$ is a color value or tuple in a target color space, and is, therefore, termed herein as a color mean. The standard deviation ($\sigma$) defines a compactness of the annotated pixels within each target color space. The value of standard deviation ($\sigma$) bears an inverse relationship with the compactness meaning that a bigger $\sigma$ indicates a smaller compactness while a smaller $\sigma$ indicates a greater compactness.

At 410, the target color space with the smallest standard deviation is selected for the corresponding clothing uniform color. Accordingly, the selected target color space is the most compact color space for the annotated pixels of the corresponding clothing uniform color and is, thereby, deemed the most appropriate color space of the target color spaces to the detection of this particular color of interest. Alternatively, other statistical measures can be used to select a color space for the clothing uniform color. For a pixel with a color value in the selected color space, whether the pixel's color is regarded as being the same as that of a clothing uniform color depends on whether the distance between pixel's color value and the clothing uniform color's statistical mean $\mu$ is smaller than a threshold color distance (or color distance in short).

The color distance is determined, for example, based on the percentage of the annotated pixels that are regarded as in the clothing uniform color. For instance, if 90% of all annotated color pixels are regarded as in the clothing uniform color, the radius of the smallest sphere (for three-dimensional color spaces) or smallest circle (for two-dimensional color spaces), centered on the clothing uniform color's statistical mean $\mu$, that includes 90% of all annotated color pixels is the color distance (also interchangeably referred to herein as allowed distance). The color mean and color distance for annotated pixels of each clothing uniform color are computed at 412.

At 414, the selected color space, computed color mean, and color distance for each clothing uniform color are stored collectively as a color label into a color label database (not shown). Moreover, a color label indicates the clothing uniform to which the color label is associated. In one illustrative embodiment, a color label is also camera dependent. In other words, the same clothing uniform color within two frames from two different cameras is represented by two color labels. Additionally, at 414, a color detector for each color label is determined by determining a decision function. A decision function is used to verify matching between a color label and a color pixel. One example decision function is a Euclidean distance comparator that returns true when an input is less than a predetermined distance value and false when the input is greater than the predetermined distance value.

Turning back to the description of method 200 of FIG. 2, at 208, the video analytic device 100 checks whether each of the multiple colors within any clothing uniform are detected at 206. If all of the multiple colors within each clothing uniform are not detected, the video analytic device 100 continues to process the next frame of video at 202. If each of the multiple colors within any clothing uniform is detected in the current frame, the video analytic device 100, at 212, classifies the detected colors of clothing uniforms in a higher resolution image of the frame to detect colors of interest with higher accuracy. In this illustrative embodiment, the higher resolution image of the frame is the frame itself. The color classification process is further illustrated by reference to a method 500 shown as a flowchart in FIG. 5.

Using an invariant color feature, such as a histogram, the video analytic device 100 classifies (by performing method 500) pixel colors to detect colors of interest with higher accuracy than method 300. A color histogram is a color representation of a small pixel region, and is, thereby, robust to small color variations. Alternatively, other invariant color features, such as color moments, moment invariants, and color scale invariant feature transform (SIFT) descriptors, can be used to practice the present teachings. At 502, the video analytic device 100 retrieves the current frame of video that is received at 202. Depending on the particular implementation scenario, either the entire frame or a portion thereof (e.g., the incremental region) is processed using method 300. If only a portion of the frame is processed, indication of a color detection region, determined at 204, within the frame is retrieved or received at 502.

At 504, the RGB color value for each pixel in the color detection region is transformed into each predetermined or target color space that is selected at 410. At 506, in each target color space, a color histogram is computed for each pixel in the set of detected color pixels determined at 308. Each color histogram is computed based on color values of the pixels in a N×N pixel window centered on a pixel in the set of detected color pixels. At 508, trained color classifiers (also referred to herein as classifiers and color classifiers) are retrieved from a color classifier database 510, and are applied to each color histogram. In other words, a trained color classifier decision function is applied to the color histograms. If the result of the application of a trained classifier decision function on a pixel's color histogram is greater than the decision function's corresponding threshold, the pixel is regarded as in the clothing uniform color corresponding to the trained classifier decision function. Moreover, the clothing uniform color is regarded as having been classified in the current frame. Accordingly, color classifiers are another example of color representation constraints. The pixel is then, at 508, assigned to a color label having a same clothing uniform color as the classifier. All the pixels that are assigned to a color label based on color classifiers are collectively termed herein as a set of classified color pixels. Training of color classifiers is illustrated by reference to a method 600 shown as a flowchart in FIG. 6.

The video analytic device 100, at 602, retrieves or receives the same training frame indicated at 402. At 604, the video analytic device 100 enables a user to annotate (or select) pixels that are annotated for each clothing uniform color at 404. In this illustrative embodiment, each annotated pixel's color value is a RGB tuple. At 606, for each clothing uniform color within the training frame, the annotated pixels' color values are transformed from RGB tuples to color values in the target color space (i.e., a predetermined color space) selected at 410.

At 608, a color histogram is extracted (i.e., computed) for each annotated pixel. To extract a color histogram for a pixel, an M×M (meaning an integer, such as 3 or 5) pixel window centered on the pixel is identified first. For example the pixel window is a 5×5 pixel square, including 25 pixels, when the value of M is 5. Based on the color values, in the color space selected at 410, of all the pixels in the selected pixel window, a color histogram is computed. At 610, a discriminative classifier is trained based on the color histogram of each annotated pixel. In this illustrative embodiment, a Support Vector Machine (SVM) classifier is trained at 610. Alternatively, other classifiers, such as AdaBoost, neural network, decision tree, and random forest, can be selected and trained at 610. A trained SVM classifier is identified by a SVM decision function, a trained threshold, and other trained parameters. At 612, the trained SVM classifier for each annotated pixel of a clothing uniform color is stored in a color classifier database (not shown). Each color classifier corresponds to and is associated with a color label that has a same clothing uniform color as the color classifier. The color label database and the color classifier database can be implemented as a single or separate databases.

Turning back to the description of method 200 of FIG. 2, at 214, the video analytic device 100 identifies color regions within the frame by growing the set of classified color pixels, identified at 508, into continuous regions. As used herein, both the set of classified color pixels and the continuous regions are termed as color regions. One benefit of the continuous regions is that isolated pixels (meaning outlying pixels) are separated from continuous pixels (meaning adjacent pixels) of a same color within the set of classified color. Accordingly, color detection accuracy is increased. For example, the video analytic device 100 performs a set of morphological operations on the set of classified color pixels to identify color regions within the frame. Growing the color regions is further illustrated by reference to a method 700 shown as a flowchart in FIG. 7.

The video analytic device 100, at 702, retrieves the current frame of video that is received at 202. At 704, morphological operators are applied to the set of classified color pixels, identified at 508, within the frame. For example, morphological opening and closing operators are used to form continuous regions and remove outliers respectively. The application of the morphological operators forms continuous regions (meaning color regions) within the frame. Each color region comprises pixels of a same color (i.e., color of the color region), wherein the pixels in the color region are regarded as connected pixels. At 706, in each color region within the frame, each pixel is assigned to a color label that matches the color of the color region, and a color region identifier (e.g., an integer, such as 3 and 20).

Turning back to the description of method 200 of FIG. 2, at 216, the video analytic device 100 identifies, for the current frame, each clothing uniform wherein each of its clothing uniform colors was classified at 212. Moreover, a set of constraints associated with each identified clothing uniform is determined at 216. The set of constraints includes color representation constraints, such as color labels and color classifiers, and geometric constraints specifying, individual and joint, geometric characteristics of the color regions for each clothing uniform. The geometric constraints include one or more color region size constraints, such as maximum size constraints and minimum size constraints, and color region relationship constraints. A size constraint indicates size limits on a color region. The size of a color region within a frame depends on the position, distance, and angle, of the corresponding clothing uniform, relative to the camera that captures the frame. Where a color region's size is greater than a minimum size (defined by a minimum size constraint) and less than a maximum size (defined by a maximum size constraint), the color region satisfies the size constraints. Otherwise, the color region fails to satisfy the size constraints and is, thereby, not considered to identify or indicate the clothing uniform corresponding to the size constraints.

Shape (such as circle and square) of a color region is a geometric constraint describing an individual geometric characteristic of the color region. Color region relationship constraints describe the interrelationship between color regions. For example, a clothing uniform, with a blue torso and two green sleeves, has a color region relationship constraint: one blue color region between two green regions. In another example, a clothing uniform with its top half in a red color and its bottom half in a green color, has a color region relationship constraint: a red color region is on top of and adjacent to a green color region. The video analytic device 100, at 216, verifies that the color regions, identified at 214, collectively conform to all constraints of any clothing uniform by applying all constraints associated with that uniform to the color regions. The verification process is further illustrated by reference to a method 300 shown as a flowchart in FIG. 8.

Method 800 starts after color regions in a frame of video are identified. At 802, for each type of multicolor clothing uniform, color representation constraints and geometric constraints are retrieved from, for example, a database (not shown). At 804, the color regions, generated at 214, within the current frame of video are retrieved. At 806, based on the color representation constraints, the video analytic device 100 determines whether the colors of the color regions include every clothing uniform color of any type of clothing uniform. If the colors of the color regions do not include every color of any type of multicolor clothing uniform, method 800 stops processing the current frame at 808. Otherwise, the size and geometric characteristics for each color region within the current frame are computed and determined at 810.

At 812, the video analytic device 100 checks whether all or some of the color regions within the current frame satisfy the color region size, color region relationship, and other geometric constraints of any type of clothing uniform. If the color regions do not satisfy the constraints of any type of multicolor clothing uniform, method 800 stops processing the current frame at 808. Otherwise, at 814, the color regions that satisfy the constraints of a type of clothing uniform is regarded and labeled as representing a detected individual wearing this type of clothing uniform within the current frame. Additionally, the video analytic device 100, at 814, traverses through all unlabeled color regions to detect every individual wearing any type clothing uniform within the frame.

Turning back to the description of method 200 of FIG. 2, at 218, the video analytic device 100 checks whether the color regions, identified at 214, collectively conform to all constraints of any clothing uniform. Where the color regions fail to satisfy all constraints of each clothing uniform considered, the video analytic device 100 continues by receiving the next frame of video at 202. Otherwise, the video analytic device 100, at 220, determines the count of people wearing each known clothing uniform that are identified or detected within the frame. For example, where two people wearing a same type of multicolor clothing uniform are detected within the frame, the count of people wearing this type of clothing uniform is two. In another example, where one individual wearing a first type of clothing uniform and another individual wearing a second type of clothing uniform are detected within the frame, the count of people wearing each type of clothing uniform is one.

Sometimes, the video analytic device 100 fails to detect the correct count of people within frames of video due to various reasons, such as bad image quality of a frame, occlusion of clothing uniform by other objects, and long distance between clothing uniform and video camera. However, the count of people wearing clothing uniforms within a field-of-view of a camera generally remains the same during short time periods (e.g., ten seconds). Accordingly, for every P, wherein P is an integer, such as 8 or 10, consecutive frames, the video analytic device 100 analyzes and smoothes the count of people within the P frames, and determines a final count of people for each of the P frames. For example, for every eight consecutive frames, the video analytic device 100 analyzes the eight counts of people within the eight consecutive frames, and determines a mode from the eight counts. Subsequently, the video analytic device 100 sets (i.e., assigns) the mode as a final count of people for selected frames of the eight consecutive frames. In one embodiment of the example, the selected frames include each of the eight consecutive frames. Alternatively, the selected frames include all, but the first and last, frames of the eight consecutive frames. At 222, the video analytic device 100 determines whether P frames have been processed. If P frames have been processed, the video analytic device 100, at 224, smoothes the count of people within the P frames. Otherwise, the video analytic device 100 receives the next frame of video at 202. After the video analytic device 100 smoothes the count of people within the P frames, the video analytic device 100 receives the next frame of video at 202.

Figure 9:
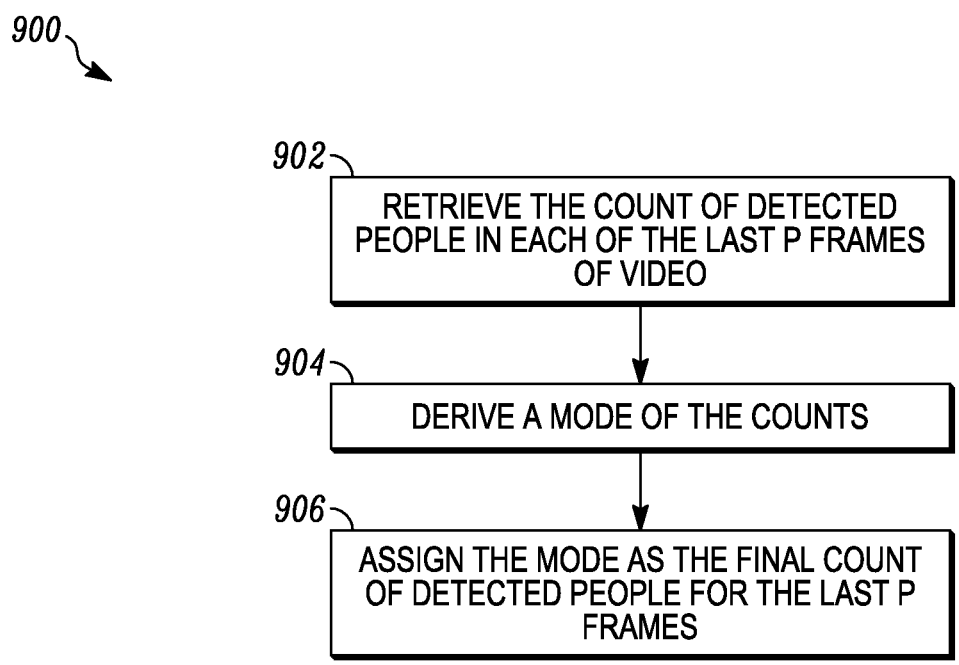
FIG. 9 is a logical flowchart illustrating a method for smoothing counts of people to enable the detecting of people within frames of video based upon multiple colors within their clothing in accordance with some embodiments.

Turning now to FIG. 9, a logical flowchart illustrating a method 900 for smoothing counts of people in accordance with some embodiments is shown. Due to various reasons, the count of people detected within a frame can be erroneous. For example, bad image quality and occlusion of clothing uniform cause erroneous people detection within a frame. However, the number of people wearing clothing uniforms at a place, such as a field-of-view (FOV) of a video camera, generally remains constant within a short time period (e.g., ten (10) seconds). By taking advantage of the temporal constant number of people in the FOV of a camera, method 900 smoothes the counts of people within a plurality (meaning more than one) of frames of video. Depending on particular embodiments of the present teachings, the plurality of frames may or may not include the current frame received at 202. Moreover, the plurality of frames may or may not be consecutive frames.

At 902, the counts of people detected in a plurality of frames of video, such as the last P frames, are retrieved. At 904, an analysis is performed on the counts of people. Many mathematical and statistical analyses can be performed to reduce or eliminate erroneous counts. For example, at 904, a statistical mode is derived from the counts of people detected in the plurality of frames of video. At 906, the derived mode is set as the final count of people for each of the plurality of frames.

Oftentimes the field-of-views of multiple video cameras monitoring the same area at a workplace overlap with each other. However, the same people wearing clothing uniforms in the overlapping areas should not be counted more than once. A double counting problem arises where a person in the overlapping area is detected and counted within frames from different cameras. Careful alignment of adjacent and opposing cameras generally reduces the severity of, although it may not completely eliminate, the double counting problem.

Figure 10:
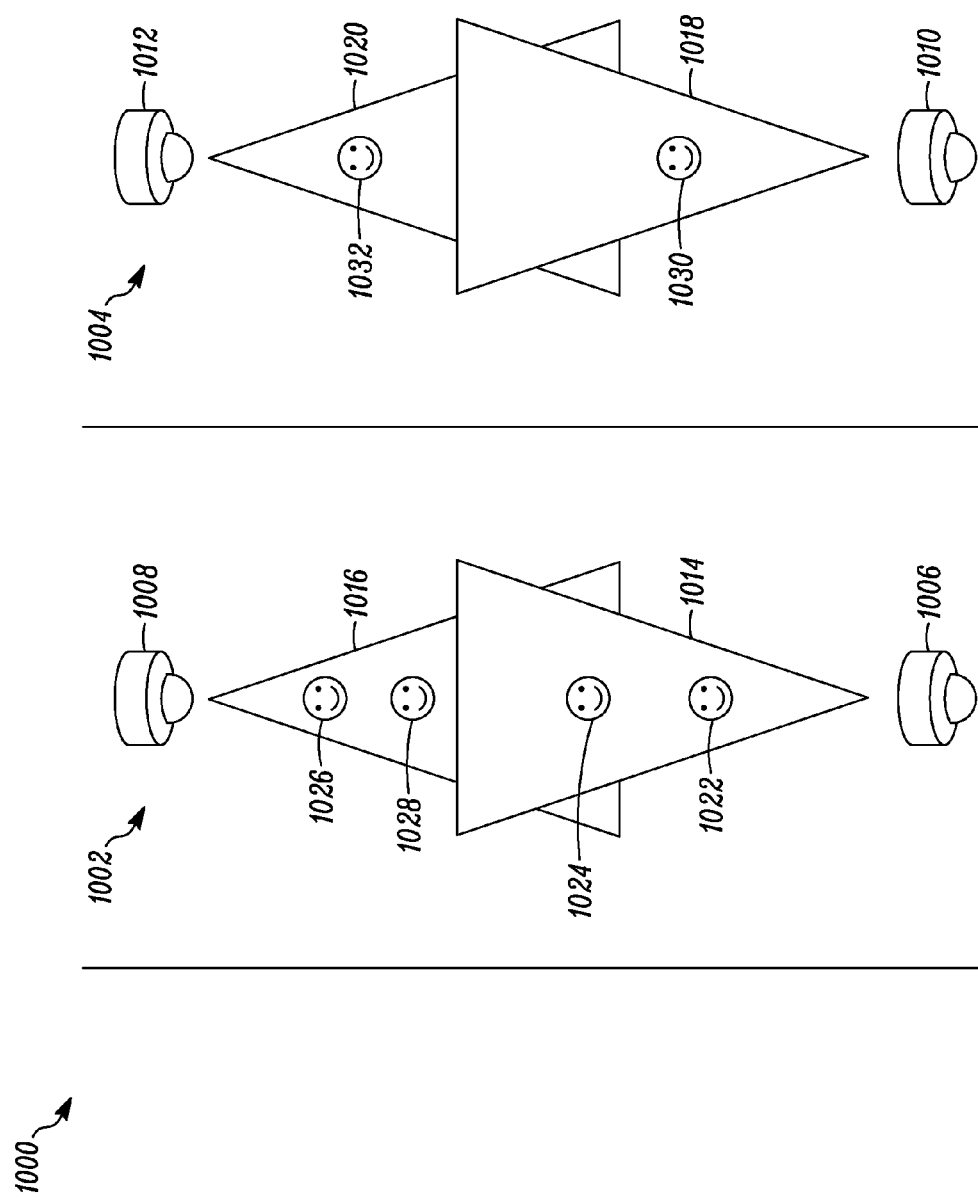
FIG. 10 is a multiple cameras layout diagram illustrating a result of detecting people within frames of video based upon multiple colors within their clothing in accordance with some embodiments.

Example camera layouts with overlapping FOVs are illustrated by reference to FIGS. 10 and 11. Turning now to FIG. 10, video cameras 1006-1012 are deployed in two aisles 1002 and 1004. FOV 1014 of camera 1006 overlaps with FOV 1016 of camera 1008, and FOV 1018 of camera 1010 overlaps with FOV 1020 of camera 1012. People 1022-1032 are all wearing the same clothing uniforms. People 1022 and 1024 are in FOV 1014, and people 1024, 1026, and 1028 are in FOV 1016. Person 1024 is in both FOV 1014 and FOV 1016. To avoid double counting of person 1024, one method is to only count detected people in the overlapping area between FOVs 1014 and 1016 when the method 200 is performed on frames from the camera 1006 or 1008. An alternative method is to remove the overlapping area, between FOVs 1014 and 1016, from the color detection regions within frames from camera 1006 or 1008 when the method 200 is performed.

FOV 1018 and FOV 1020 overlap with each other. However, in the illustrative FIG. 10, there are no people wearing clothing uniforms in the overlapping area. Accordingly, double counting problem does not exist for the two cameras 1010 and 1012 at the moment when person 1030 is only in FOV 1018 and person 1032 is only in FOV 1020.

Figure 11:
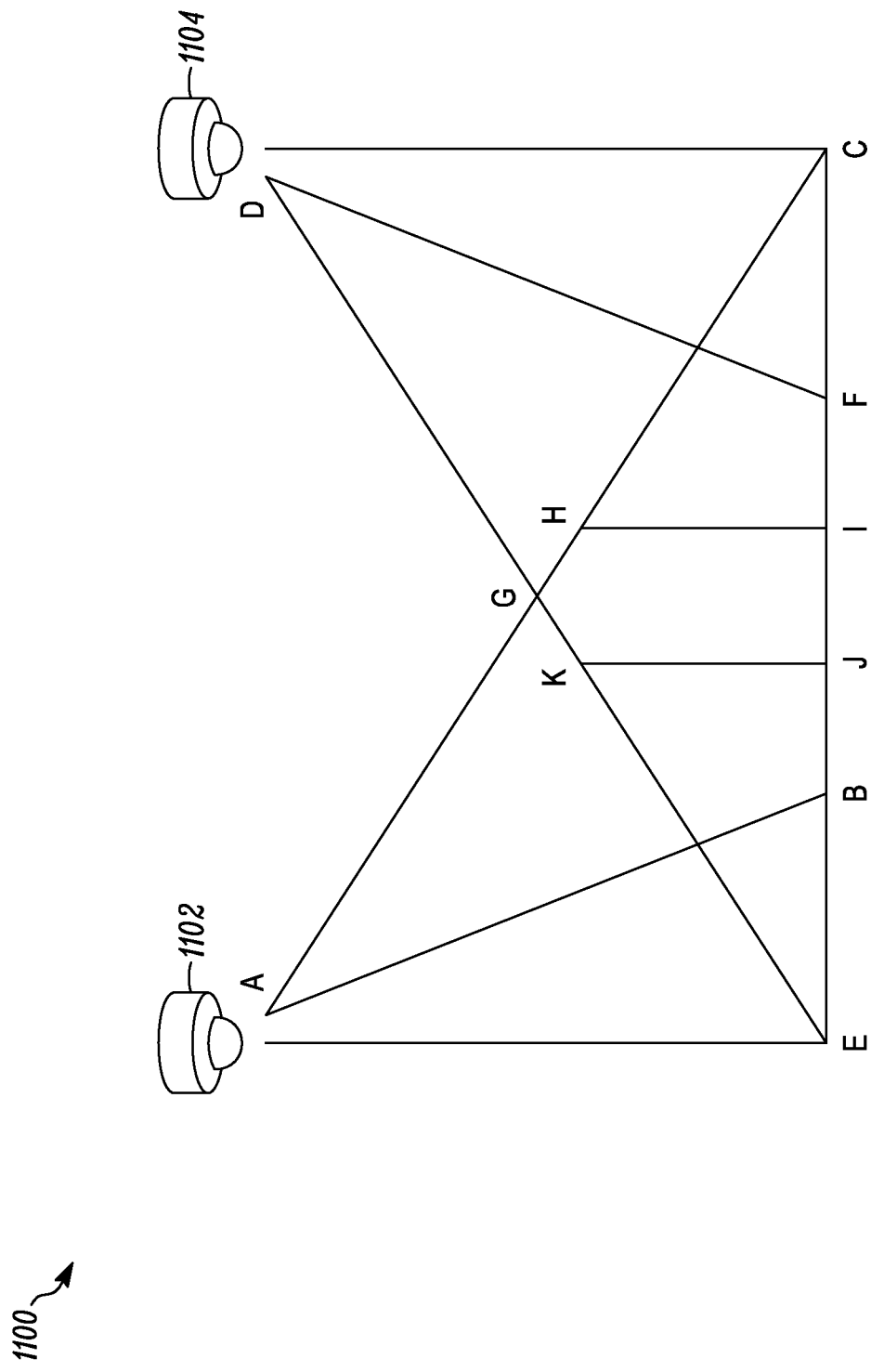
FIG. 11 is a multiple cameras layout diagram illustrating a method for eliminating double counting to enable the detecting of people within frames of video based upon multiple colors within their clothing in accordance with some embodiments.

Turning now to FIG. 11, a multiple cameras layout diagram illustrating a method for eliminating double counting in accordance with some embodiments is shown. Two opposing cameras 1102 and 1104 are mounted inside an aisle at a workplace. FOV of camera 1102 is denoted by the triangle enclosed by vertices A, B, and C. FOV of camera 1104, overlapping with the FOV of camera 1102, is denoted by the triangle enclosed by vertices D, E, and F. With careful alignment of the two cameras 1102 and 1104, people wearing clothing uniforms in the area enclosed by vertices E, J, and K are not detectable in frames of video from camera 1104. Similarly, people wearing clothing uniforms in the area enclosed by vertices C, H, and I are not detectable in frames of video from camera 1102. Accordingly, the double counting problem exists only for the area enclosed by vertices K, G, H, I, and J. To eliminate the double counting problem, a certain number of rows of pixels on top of frames from one or both cameras 1102 and 1104 are removed. Alternatively, the certain number of rows of pixels is designated as outside of the color detection region in the respective frames. Such designation is performed at 204 of method 200.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for detecting people within video frames based upon multiple colors within their clothing as described herein. The non-processor circuits may include, but are not limited to, a radio receiver, a radio transmitter, signal drivers, clock circuits, power source circuits, and user input devices. As such, these functions may be interpreted as steps of a method to perform the detecting people within video frames based upon multiple colors within their clothing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, performed in a video analytic device, for detecting people within frames of video based upon multiple colors within their clothing, the method comprising:
receiving a current frame of video;
determining that a first color region within the current frame matches a first color of interest for a clothing uniform, wherein the determining is based on a first set of color representation constraints;
determining that a second color region within the current frame matches a second color of interest for the clothing uniform, wherein the determining is based on a second set of color representation constraints, wherein the first and second colors of interest are different; and
applying a set of geometric constraints to the first and second color regions to determine a count of people within the current frame wearing the clothing uniform, wherein the first set of color representation constraints comprises a first color label and a first color classifier that represent the first color of interest, and the second set of color representation constraints comprises a second color label and a second color classifier that represent the second color of interest,
wherein determining that the first color region within the current frame matches the first color of interest and determining that the second color region within the current frame matches the second color of interest comprise:
determining, within a first resolution image of the current frame, a first set of pixels that match the first color label and a second set of pixels that match the second color label;
applying, within a second resolution image of the current frame, the first color classifier to the first set of pixels to classify the first set of pixels to determine the first color region, wherein the second resolution is higher than the first resolution; and
applying, within the second resolution image of the current frame, the second color classifier to the second set of pixels to classify the second set of pixels to determine the second color region.

2. The method of claim 1, wherein the first and second color labels each comprise a color space that is selected from a plurality of color spaces based upon the particular color of interest represented by the color label.

3. The method of claim 2, wherein the plurality of color spaces comprises a normalized Red, Green, and Blue color space and a Hue, Saturation, and Intensity color space.

4. The method of claim 2, wherein the first and second color classifiers are determined using a color histogram.

5. The method of claim 1 further comprising determining a color detection region within the current frame, wherein the color detection region comprises a portion of the entire current frame and includes the first color region and the second color region, wherein the color detection region in the current frame corresponds to detected color regions within a preceding frame of the current frame.

6. The method of claim 1 further comprising analyzing a count of people for each of a plurality of frames of the video, including the current frame, to determine a final count of people for each of the plurality of frames.

7. The method of claim 6, wherein the final count of people for each of the plurality of frames is a mode of the counts of people for the plurality of frames.

8. The method of claim 1, wherein the first and second color labels each comprise a color space that is selected from a plurality of color spaces, wherein selecting the color space for each color label comprises:
annotating, within a training frame of video, pixels for each color of interest;
determining a compactness within a set of color spaces from the pixels for each color of interest; and
selecting the color space from the set of color spaces based on the compactness within the set of color spaces.

9. The method of claim 8 further comprising:
deriving a set of statistical measures from the pixels for each color of interest; and
training the color label for each color of interest, wherein the color label comprises the set of statistical measures and the selected color space.

10. The method of claim 9, wherein the set of statistical measures comprises a color mean and a color distance.

11. The method of claim 8 further comprising:
extracting, in the selected color space, an invariant color feature for each of the pixels for each color of interest; and
training a classifier for each color of interest based on the extracted invariant color feature.

12. The method of claim 11, wherein the invariant color feature is a color histogram and the classifier is a Support Vector Machine (SVM) classifier.

13. The method of claim 1, wherein the set of geometric constraints comprises at least one of a minimum size constraint, a maximum size constraint, or a color region relationship.

14. A non-transient computer-readable storage element having computer readable code stored thereon for programming a computer to perform a method for detecting people within frames of video based upon multiple colors within their clothing, the method comprising:
receiving a current frame of video;
detecting, within a first resolution image of the current frame, multiple colors of interest to identify a first set of pixels of interest;
classifying, within a second resolution image of the current frame, colors of a second set of pixels of interest to identify pixels of the multiple colors of interest, wherein the second set of pixels of interest correspond to the first set of pixels of interest, and wherein the second resolution is higher than the first resolution;
determining a set of color regions within the second resolution image, wherein each of the color regions within the set contains at least one of the pixels of the multiple colors of interest; and
verifying that the set of color regions conform to a set of geometric constraints to determine a count of people, within the current frame, wearing a same type of clothing having the multiple colors of interest.

15. The storage element of claim 14, wherein each color of interest is associated with a color label, wherein detecting the multiple colors of interest comprises determining that each of the pixels in the first set of pixels of interest matches one of the color labels, wherein each color label comprises a color space, a color mean, and a color distance.

16. The storage element of claim 14, wherein classifying comprises applying a color classifier for each color of interest to each pixel in the second set of pixels of interest, wherein the color classifier is determined using an invariant color feature.

17. The storage element of claim 14, wherein the method further comprising determining a color detection region within the current frame, wherein the color detection region comprises the first set of pixels of interest, the second set of pixels of interest, and the color regions, wherein the color detection region in the current frame corresponds to detected color regions within a preceding frame of the current frame.

18. The storage element of claim 14, wherein the method further comprising:
determining a mode of a count of people over a plurality of frames of the video, including the current frame; and
selectively setting the mode as a final count of people for the plurality of frames.

19. The storage element of claim 14, wherein the set of geometric constraints comprises at least one of a minimum size constraint, a maximum size constraint, or a color region relationship.

* * * * *